US009062191B2

(12) United States Patent
Huh et al.

(10) Patent No.: US 9,062,191 B2
(45) Date of Patent: Jun. 23, 2015

(54) POLYPHENYLENE ETHER-BASED RESIN COMPOSITION AND MOLDED PRODUCT USING THE SAME

(75) Inventors: Jin-Young Huh, Uiwang-si (KR); Doo-Han Ha, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 88 days.

(21) Appl. No.: 13/459,617

(22) Filed: Apr. 30, 2012

(65) Prior Publication Data

US 2012/0214932 A1  Aug. 23, 2012

Related U.S. Application Data

(63) Continuation-in-part of application No. PCT/KR2009/007915, filed on Dec. 29, 2009.

(30) Foreign Application Priority Data

Nov. 2, 2009  (KR) .................... 10-2009-0105149

(51) Int. Cl.
| | |
|---|---|
| C08L 25/04 | (2006.01) |
| C08K 3/04 | (2006.01) |
| B82Y 30/00 | (2011.01) |
| C08L 23/08 | (2006.01) |
| C08L 71/12 | (2006.01) |
| C08J 5/00 | (2006.01) |
| C08L 77/00 | (2006.01) |
| C08K 7/24 | (2006.01) |
| C08L 51/06 | (2006.01) |
| C08L 53/02 | (2006.01) |

(52) U.S. Cl.
CPC ........... *C08L 23/0869* (2013.01); *C08L 71/123* (2013.01); *C08J 5/005* (2013.01); *C08L 77/00* (2013.01); *B82Y 30/00* (2013.01); *C08L 23/08* (2013.01); *C08K 3/04* (2013.01); *C08K 7/24* (2013.01); *C08L 51/06* (2013.01); *C08L 53/02* (2013.01); *C08J 2371/12* (2013.01); *C08J 2377/00* (2013.01); *C08J 2423/08* (2013.01); *C08J 2471/12* (2013.01)

(58) Field of Classification Search
CPC ........... C08L 25/04; C08K 3/04; B82Y 30/00
USPC .................... 252/500; 524/496; 977/742, 783
See application file for complete search history.

(56) References Cited

U.S. PATENT DOCUMENTS

| | | |
|---|---|---|
| 4,315,086 A | 2/1982 | Ueno et al. |
| 4,345,013 A | 8/1982 | Diamond et al. |
| 4,600,741 A | 7/1986 | Aycock et al. |
| 4,772,664 A | 9/1988 | Ueda et al. |
| 5,141,984 A | 8/1992 | Orikasa et al. |
| 5,244,973 A | 9/1993 | Sakazume et al. |
| 5,424,360 A | 6/1995 | Nagoka et al. |
| 5,559,185 A | 9/1996 | Abe et al. |
| 5,886,094 A | 3/1999 | Sanada et al. |
| 5,981,656 A | 11/1999 | McGaughan et al. |
| 6,096,818 A | 8/2000 | Nakaura et al. |
| 6,353,050 B1 | 3/2002 | Bastiaens et al. |
| 6,498,228 B1 | 12/2002 | Nodera et al. |
| 7,008,991 B2 | 3/2006 | Takagi et al. |
| 7,022,776 B2 | 4/2006 | Bastiaens et al. |
| 2002/0099124 A1 | 7/2002 | Patel |
| 2003/0023006 A1 | 1/2003 | Patel |
| 2003/0078331 A1 | 4/2003 | Kim et al. |
| 2003/0130406 A1 | 7/2003 | Van Bennekom et al. |
| 2004/0262581 A1 | 12/2004 | Rodrigues |
| 2006/0108567 A1* | 5/2006 | Charati et al. ............... 252/500 |
| 2006/0229399 A1 | 10/2006 | Panzer et al. |
| 2007/0029530 A1 | 2/2007 | Noda et al. |
| 2007/0205401 A1 | 9/2007 | Terada et al. |
| 2007/0235698 A1 | 10/2007 | Borade et al. |
| 2007/0238832 A1 | 10/2007 | Borade et al. |
| 2009/0261303 A1 | 10/2009 | Kim et al. |
| 2009/0321687 A1 | 12/2009 | Kim et al. |

FOREIGN PATENT DOCUMENTS

| | | |
|---|---|---|
| CN | 1606590 | 4/2005 |
| CN | 1906249 A | 1/2007 |
| CN | 101321831 A | 12/2008 |
| CN | 101437897 | 5/2009 |
| EP | 0550206 A2 | 7/1993 |
| EP | 0550210 A1 | 7/1993 |
| EP | 0747440 A1 | 12/1996 |
| EP | 1117734 B1 | 9/2005 |
| EP | 1666532 A1 | 6/2006 |
| JP | 05-255585 A | 10/1993 |
| JP | 05-255586 A | 10/1993 |
| JP | 06-184436 A | 7/1994 |
| JP | 07-026135 A | 1/1995 |
| JP | 09-124927 A | 5/1997 |
| JP | 09-279012 A | 10/1997 |
| JP | 2008-108903 A | 5/2008 |

(Continued)

OTHER PUBLICATIONS

Extended European Search Report in counterpart European Application No. 09850919.3 dated Feb. 13, 2013, pp. 1-5.
European Search Report in commonly owned European Application No. 10166908 dated Nov. 24, 2010, pp. 1-5.
Taiwanese Search Report in commonly owned Taiwanese Application No. 098145795 dated Nov. 26, 2012, pp. 1.
International Search Report in counterpart International Application No. PCT/KR2009/007915 dated Dec. 17, 2010, pp. 1-8.

*Primary Examiner* — James J Seidleck
*Assistant Examiner* — Deve E Valdez
(74) *Attorney, Agent, or Firm* — Additon, Higgins, & Pendleton, P.A.

(57) ABSTRACT

Disclosed is a polyphenylene ether-based resin composition that includes (A) a base resin including (A-1) polyphenylene ether-based resin and (A-2) polyamide resin, (B) carbon nanotubes, (C) a styrene-based copolymer, and (D) an olefin-based copolymer.

14 Claims, No Drawings

(56) References Cited

FOREIGN PATENT DOCUMENTS

| | | |
|---|---|---|
| JP | 2008-208168 A | 9/2008 |
| KR | 10-1989-0003889 | 4/1989 |
| KR | 10-1991-0004746 | 3/1991 |
| KR | 2002-0026759 A | 4/2002 |
| KR | 10-0550264 B | 7/2004 |
| KR | 10-0573443 | 4/2006 |
| KR | 10-2006-0061306 A | 6/2006 |
| KR | 10-0653544 B | 7/2006 |
| KR | 10-0706651 B1 | 4/2007 |
| KR | 10-0706652 B1 | 4/2007 |
| KR | 10-0792781 B1 | 1/2008 |
| KR | 10-0792783 B1 | 1/2008 |
| TW | 1227718 | 2/2005 |
| TW | 200911920 | 3/2009 |
| WO | 2008/054850 A2 | 5/2008 |
| WO | 2008/078850 A1 | 7/2008 |
| WO | 2010/021437 A1 | 2/2010 |
| WO | 2011/052848 A1 | 5/2011 |

* cited by examiner

POLYPHENYLENE ETHER-BASED RESIN COMPOSITION AND MOLDED PRODUCT USING THE SAME

CROSS-REFERENCE TO RELATED APPLICATIONS

This application is a continuation-in-part of International Application No. PCT/KR2009/007915, filed Dec. 29, 2009, pending, which designates the U.S., published as WO 2011/052848, and is incorporated herein by reference in its entirety, and claims priority therefrom under 35 USC Section 120. This application also claims priority under 35 USC Section 119 from Korean Patent Application No. 10-2009-0105149, filed Nov. 2, 2009, in the Korean Intellectual Property Office, the entire disclosure of which is also incorporated herein by reference.

FIELD

This disclosure relates to a polyphenylene ether-based resin composition and a molded product using the same.

BACKGROUND

Polyphenylene ether resin, or a mixture of a polyphenylene ether resin and a polystyrene resin, is widely used in various applications such as automobile parts, electrical parts, and electronic parts due to its excellent mechanical and electrical properties at a high temperature. However, polyphenylene ether resin has poor chemical resistance and workability.

Polyamide resin has good chemical resistance and workability, but poor heat resistance and dimensional stability, and a high moisture absorption ratio. Therefore, there are limited applications for the same as an engineering plastic resin.

A combination of the two resins can provide improved chemical resistance, workability, and heat resistance and can provide engineering plastic resins having an excellent balance of properties.

In order to provide such a resin with conductivity, a conductive additive such as carbon black, carbon nanotube, a carbon fiber, a metal powder, a metal-coated inorganic powder, or a metal fiber may be used. However, when the carbon black is added in a significant amount (more than or equal to 3 wt % with respect to the total amount of a resin composition), sufficient electrical conductivity may not be ensured. In addition, while when a large amount of the conductive additive is added, basic mechanical properties of an electrically conductive thermoplastic resin such as impact resistance and the like may be significantly decreased.

Carbon fiber can be an excellent additive for providing electrical conductivity and enhancing strength but it can result in poor surface quality of a composite and can also deteriorate impact strength and elongation.

Carbon nanotubes are conductive additives having excellent electrical conductivity and a high aspect ratio. Carbon nanotubes may provide a resin with electrical conductivity even when used in a small amount, but also can deteriorate impact strength. In addition, carbon nanotubes may cause problems of adsorbing additives, particularly, a reactive monomer on the surface thereof which can interfere with the function of the additive.

SUMMARY

One embodiment provides a polyphenylene-ether-based resin composition that can have an excellent balance of properties such as electrical conductivity, impact strength, and heat resistance.

Another embodiment provides a molded product made using the polyphenylene-ether-based resin composition.

The polyphenylene-ether-based resin composition can include (A) a base resin including (A-1) about 5 to about 95 wt % of a polyphenylene ether-based resin and (A-2) about 5 to about 95 wt % of a polyamide resin; (B) about 0.01 to about 5 parts by weight of carbon nanotubes, based on about 100 parts by weight of the base resin; (C) about 1 to about 20 parts by weight of a styrene-based copolymer, based on about 100 parts by weight of the base resin; and (D) about 1 to about 20 parts by weight of an olefin-based copolymer, based on about 100 parts by weight of the base resin.

The polyphenylene ether-based resin (A-1) may be a polyphenylene ether resin, or a mixture of a polyphenylene ether and a vinyl aromatic polymer. Examples of the polyphenylene ether resin may include without limitation poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly (2,3,6-trimethyl-1,4-phenylene)ether, a copolymer of poly (2,6-dimethyl-1,4-phenylene)ether, poly(2,3,6-triethyl-1,4-phenylene)ether, and the like, and combinations thereof.

Examples of the polyamide resin (A-2) may include without limitation polycaprolactam (polyamide 6), poly(11-aminoundecanoic acid) (polyamide 11), polylauryllactam (polyamide 12), polyhexamethylene adipamide (polyamide 66), polyhexamethylene azelamide (polyamide 69), polyhexamethylene sebacamide (polyamide 610), polyhexamethylene dodecanodiamide (polyamide 612), copolymers thereof, and the like, and combinations thereof.

The carbon nanotubes (B) may have a diameter of about 0.5 to about 100 nm, and a length of about 0.01 to about 100 μm.

Examples of the styrene-based copolymer resin (C) may include without limitation AB-type diblock copolymers, ABA-type triblock copolymers, radical block copolymers, and the like, and combinations thereof. The styrene-based copolymer resin (C) may also be a copolymer of a vinyl aromatic monomer and a diene. Examples of the diene may include without limitation hydrogenated unsaturated dienes, partially hydrogenated unsaturated dienes, unsaturated dienes without hydrogenation, and the like, and combinations thereof.

The olefin-based copolymer (D) may be a copolymer polymerized with different kinds of olefin-based monomers, or a copolymer of an olefin-based monomer and an acrylic-based monomer, and it may include a reactive group capable of reacting with the polyamide resin. Examples of the reactive group may include without limitation maleic anhydride groups, epoxy groups, and the like, and combinations thereof.

The polyphenylene ether-based resin composition may further include about 0.5 to about 2 parts by weight of a reactive monomer (E) based on about 100 parts by weight of the base resin. The reactive monomer (E) may include an unsaturated carboxylic acid or an anhydride group as a part thereof. Examples of the reactive monomer may include without limitation citric acid anhydride, maleic anhydride, maleic acid, itaconic anhydride, fumaric acid, (meth)acrylic acid, (meth)acrylic acid ester, and the like, and combinations thereof.

Another exemplary embodiment provides a molded product made using the polyphenylene-ether-based resin composition.

Hereinafter, further embodiments will be described in detail.

The polyphenylene ether-based resin composition can have an excellent balance of properties such as electrical conductivity, impact strength, heat resistance and the like and may be used in various applications such as a part material for an automobile tailgate, an automobile fuel door, an automobile fender, a door panel and the like.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "(meth)acrylate" refers to "acrylate" and "methacrylate."

Also as used herein, when a specific definition is not otherwise provided, the term "(meth)acrylic acid alkyl ester" refers to "acrylic acid alkyl ester" and "methacrylic acid alkyl ester," and the term "(meth)acrylic acid ester" refers to "acrylic acid ester" and "methacrylic acid ester."

The polyphenylene ether-based resin composition according to one embodiment includes (A) a base resin including (A-1) a polyphenylene ether-based resin and (A-2) polyamide resin, (B) carbon nanotubes, (C) a styrene-based copolymer, and (D) an olefin-based copolymer.

Exemplary components included in the polyphenylene-ether-based resin composition according to embodiments will hereinafter be described in detail.

(A) Base Resin (A-1) Polyphenylene Ether-based Resin

The polyphenylene ether-based resin may be a polyphenylene ether resin singularly, or a mixture of polyphenylene ether resin and a vinyl aromatic polymer.

Examples of the polyphenylene ether resin may include without limitation poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly(2,3,6-trimethyl-1,4-phenylene)ether, a copolymer of poly(2,6-dimethyl-1,4-phenylene)ether and poly(2,3,6-triethyl-1,4-phenylene)ether and the like, and combinations thereof. In exemplary embodiments, poly(2,6-dimethyl-1,4-phenylene)ether or a copolymer of poly(2,6-dimethyl-1,4-phenylene)ether and poly(2,3,6-trimethyl-1,4-phenylene)ether may be used.

The vinyl aromatic polymer includes polymerization products of vinyl aromatic monomers such as but not limited to styrene, ρ-methyl styrene, α-methyl styrene, 4-N-propyl styrene, and the like, and combinations thereof. In exemplary embodiments, the vinyl aromatic polymer includes polymerization products of styrene and α-methyl styrene.

There is no particular limit on the degree of polymerization of the polyphenylene-ether-based resin. Taking into account thermal stability and workability of a resin composition, intrinsic viscosity measured in a chloroform solvent at 25° C. may be about 0.2 to about 0.8 dl/g.

The base resin may include the polyphenylene ether-based resin in an amount of about 5 to about 95 wt %, for example about 30 to about 60 wt %, based on the total amount (or total weight) of the base resin including a polyphenylene ether-based resin and a polyamide resin. In some embodiments, the base resin may include the polyphenylene ether-based resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the polyphenylene ether-based resin can be in a range from about any of the foregoing amounts to about any other of the foregoing amounts.

When the polyphenylene-ether-based resin is included in an amount within the above range, properties of a polyphenylene-ether resin may be suitably realized and excellent impact resistance may be obtained.

(A-2) Polyamide Resin

The polyamide resin includes an amide-group in the polymer main chain, and an amino acid, lactam or diamine, and dicarboxylic acid as main components may be polymerized to provide a polyamide.

Examples of the amino acid include without limitation 6-aminocaproic acid, 11-aminoundecanoic acid, 12-aminododecanoic acid, paraminomethylbenzoic acid, and the like, and combinations thereof. Examples of the lactam include without limitation ε-caprolactam, ω-laurolactam, and the like, and combinations thereof. Examples of the diamine include without limitation an aliphatic, alicyclic, or aromatic diamine such as tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, metaxylenediamine, paraxylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and the like, and combinations thereof. Examples of the dicarboxylic acid include without limitation an aliphatic, alicyclic, or aromatic dicarboxylic acid such as adipic acid, suberic acid, azelaic acid, sebacic acid, dodecane2 acid, terephthalic acid, isophthalic acid, 2-chloroterephthalic acid, 2-methylterephthalic acid, 5-methylisophthalic acid, 5-sodium sulfoisophthalate, 2,6-naphthalenedicarboxylic acid, hexahydroterephthalic acid, hexahydroisophthalic acid, and the like, and combinations thereof. A polyamide homopolymer or copolymer derived from a raw material may be used singularly or as a mixture.

Examples of the polyamide resin may include without limitation polycaprolactam (polyamide 6), poly(11-aminoundecanoic acid) (polyamide 11), polylauryllactam (polyamide 12), polyhexamethylene adipamide (polyamide 66), polyhexamethylene azelamide (polyamide 69), polyhexamethylene sebacamide (polyamide 610), polyhexamethylene dodecanodiamide (polyamide 612), and the like, copolymers thereof such as polyamide 6/610, polyamide 6/66, polyamide 6/12, and the like. These may be used singularly or a mixture of two or more at an appropriate ratio.

The polyamide resin can have a melting point of 250° C. or more, and a relative viscosity (measured at 25° C. after adding 1 wt % of a polyamide resin in m-cresol) of 2 or more. When the melting point and relative viscosity are within the above range, excellent mechanical properties and heat resistance may be realized.

The base resin may include the polyamide resin in an amount of about 5 to about 95 wt %, for example about 40 to about 70 wt %, based on the total amount (total weight) of the base resin including a polyphenylene-ether-based resin and a polyamide resin. In some embodiments, the base resin may include the polyamide resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the polyamide resin can be in a range from about any of the foregoing amounts to about any other of the foregoing amounts.

When the polyamide resin is included in an amount within the above range, excellent compatibility with a polyphenylene-ether-based resin may be obtained.

(B) Carbon Nanotubes

The carbon nanotubes have excellent mechanical strength, mechanical characteristics such as high Young's modulus, and aspect ratio, electrical conductivity, and thermal stability. When the carbon nanotubes are used to make a polymer composite, a carbon nanotube-polymer composite having improved mechanical, thermal, and electrical properties may be provided.

Exemplary methods of synthesizing the carbon nanotubes include without limitation arc-discharge, pyrolysis, plasma chemical vapor deposition (PECVD), thermal chemical vapor deposition (CVD), electrolysis, and the like. In exemplary embodiments, the obtained carbon nanotubes may be used regardless of the synthesizing method.

The carbon nanotubes may be classified as single-walled carbon nanotubes, double-walled carbon nanotubes, and multi-walled carbon nanotubes, depending on the number of walls. In exemplary embodiments, multi-walled carbon nanotubes can be used, but the invention is not limited thereto.

The carbon nanotubes have no particular limit in size. In exemplary embodiments, the carbon nanotubes may have diameter and length of about 0.5 to about 100 nm and about 0.01 to about 100 μm, respectively, and in other exemplary embodiments, the carbon nanotubes may have a diameter and length of about 1 to about 10 nm and about 0.5 to about 10 μm, respectively. When the carbon nanotubes have a diameter and length within the above ranges, electrical conductivity and workability may be improved.

Also, the carbon nanotubes can have a large aspect ratio (L/D) because of such a large size. When carbon nanotubes having L/D of about 100 to about 1000 are used, the electrical conductivity can be improved.

The polyphenylene-ether-based resin composition can include carbon nanotubes in an amount of about 0.01 to about 5 parts by weight, for example about 0.5 to about 2 parts by weight, based on about 100 parts by weight of the base resin including the polyphenylene-ether-based resin and the polyamide resin. In some embodiments, the polyphenylene-ether-based resin composition can include the carbon nanotubes in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the amount of the carbon nanotubes can be in a range from about any of the foregoing amounts to about any other of the foregoing amounts.

When the carbon nanotubes are included in an amount within the above range, excellent electrical conductivity and impact resistance may be obtained.

(C) Styrene-based Copolymer

The styrene-based copolymer may act as an impact-reinforcing agent in the polyphenylene ether-based resin composition according to one embodiment.

The styrene-based copolymer is derived from a vinyl aromatic monomer. Examples of the styrene-based copolymer may include without limitation AB-type diblock copolymers, ABA-type triblock copolymers, radical block copolymers, and, and the like, and combinations thereof.

The block copolymer may be a copolymer of a vinyl aromatic monomer, and a diene, such as but not limited to a hydrogenated unsaturated diene, a partially hydrogenated unsaturated diene, an unsaturated diene without hydrogenation, or a combination thereof.

Examples of the vinyl aromatic monomer may include without limitation styrene, ρ-methyl styrene, α-methyl styrene, 4-N-propyl styrene, and the like, and combinations thereof. Styrene, α-methyl styrene, and the like may be used in exemplary embodiments. These monomers may be used singularly or as a mixture.

Examples of the AB-type diblock copolymer include without limitation polystyrene-polybutadiene copolymers, polystyrene-polyisoprene copolymers, polyalphamethylstyrene-polybutadiene copolymers, hydrogenated copolymers thereof, and the like, and combinations thereof. The AB-type diblock copolymer is commercially well known in this field. Examples of the AB-type diblock copolymer include without limitation Solprene and K-resin manufactured by Phillips, and Kraton D and Kraton G manufactured by Shell Co., Ltd.

Examples of the ABA-type triblock copolymer include without limitation copolymers such as polystyrene-polybutadiene-polystyrene (SBS), polystyrene-polyisoprene-polystyrene (SIS), polyalphamethylstyrene-polybutadiene-polyalphamethylstyrene, polyalphamethylstyrene-polyisoprene-polyalphamethylstyrene, hydrogenated copolymers thereof, and the like, and combinations thereof. The ABA-type triblock copolymer is well known in the commercial field. Examples of the ABA-type triblock copolymer include without limitation Cariflex, Kraton D, and Kraton G manufactured by Shell Co., Ltd., Septon manufactured by Kuraray Co., Ltd., and the like.

The polyphenylene-ether-based resin composition can include the styrene-based copolymer resin in an amount of about 1 to about 20 parts by weight, for example about 2 to about 12 parts by weight, based on about 100 parts by weight of the base resin including the polyphenylene ether-based resin and polyamide resin. In some embodiments, the polyphenylene-ether-based resin composition can include the styrene-based copolymer resin in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the styrene-based copolymer resin can be in a range from about any of the foregoing amounts to about any other of the foregoing amounts.

When the styrene-based copolymer resin is included in an amount within the above range, impact resistance can be significantly increased without decreasing excellent compatibility of a polyphenylene-ether-based resin and a polyamide resin.

(D) Olefin-based Copolymer

The olefin-based copolymer may act as an impact-reinforcing agent in the polyphenylene ether-based resin composition according to one embodiment, as in the styrene-based copolymer.

The olefin-based copolymer may include a copolymer polymerized with different kinds of olefin-based monomers or a copolymer of an olefin-based monomer and an acrylic-based monomer.

The olefin-based monomer may include C1 to C10 alkylene. Examples thereof may include without limitation ethylene, propylene, isopropylene, butylene, isobutylene, octane, and the like. These monomers may be used singularly or as a mixture.

Examples of the acrylic-based monomer may include without limitation (meth)acrylic acid alkyl esters, (meth)acrylic acid esters, and the like, and combinations thereof. As used herein, the term alkyl refers to C1 to C10 alkyl. Examples of (meth)acrylic acid alkyl esters may include without limitation methyl(meth)acrylate, ethyl(meth)acrylate, propyl(meth)acrylate, butyl(meth)acrylate and the like, and combinations thereof. In exemplary embodiments, the acrylic-based monomer may include methyl(meth)acrylate.

The olefin-based copolymer may include a reactive group capable of reacting with polyamide to improve the dispersion with a polyphenylene ether-based resin and a polyamide resin. In other words, the olefin-based copolymer can have a structure in which the reactive group is grafted in a main chain including an olefin-based monomer, or a copolymer of an olefin-based monomer and an acrylic-based monomer. Examples of the reactive group may include without limitation maleic anhydride groups, epoxy groups, and the like. The groups may be used singularly or as a mixture.

The olefin-based copolymer may be prepared by using Ziegler-Natta catalyst, which is a generally-used olefin polymerization catalyst, or may be prepared by using a metallocene-based catalyst to provide a further selective structure.

The polyphenylene-ether-based resin composition can include the olefin-based copolymer in an amount of about 1 to about 20 parts by weight, for example about 2 to about 12 parts by weight, based on about 100 parts by weight of the base resin including the polyphenylene-ether-based resin and the polyamide resin. In some embodiments, the polyphenylene-ether-based resin composition can include the olefin-based copolymer in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the olefin-based copolymer can be in a range from about any of the foregoing amounts to about any other of the foregoing amounts.

When the olefin-based copolymer is included in an amount within the above range, the impact resistance can be significantly improved with minimal or no deterioration of the excellent compatibility of polyphenylene ether-based resin and polyamide resin.

(E) Reactive Monomer

The reactive monomer includes an unsaturated carboxylic acid or the anhydride group thereof and acts to form a polyphenylene ether-based resin which is modified by grafting with the polyphenylene ether-based resin according to one embodiment.

Specific examples of the reactive monomer may include without limitation citric acid anhydride, maleic anhydride, maleic acid, anhydrous itaconic acid, fumaric acid, (meth)acrylic acid, (meth)acrylic acid ester, and the like, and combinations thereof. Examples of the (meth)acrylic acid ester include without limitation (meth)acrylic acid C1-C10 alkyl esters, such as methyl(meth)acrylate, ethyl(meth)acrylate, propyl(meth)acrylate, butyl(meth)acrylate and the like, and combinations thereof. In exemplary embodiments, citric acid anhydride may be used since it may form the modified polyphenylene ether-based resin without using an initiator.

The method of manufacturing the modified polyphenylene ether-based resin which is grafted with the reactive monomer is not specifically limited. In exemplary embodiments, the grafting reaction can be performed using a melt mixing process and a phosphite-based heat stabilizer in view of the relatively high operation temperature.

The polyphenylene-ether-based resin composition can include the reactive monomer in an amount of about 0.5 to about 2 parts by weight, for example about 0.5 to about 1.2 parts by weight, based on about 100 parts by weight of the base resin including the polyphenylene-ether-based resin and the polyamide resin. In some embodiments, the polyphenylene-ether-based resin composition can include the reactive monomer in an amount of about 0.5, 0.6, 0.7, 0.8, 0.9, 1, or 2 parts by weight. Further, according to some embodiments of the present invention, the amount of the reactive monomer can be in a range from about any of the foregoing amounts to about any other of the foregoing amounts.

When the reactive monomer is included in an amount within the above range, the polyphenylene-ether-based resin composition may have improved compatibility and excellent impact resistance.

(F) Other Additive(s)

The polyphenylene ether-based resin composition according to one embodiment may further include one or more additives. Examples of the additives include without limitation antibacterial agents, heat stabilizers, antioxidants, release agents, light stabilizers, inorganic material additives, surfactants, coupling agents, plasticizers, admixtures, stabilizers, lubricants, antistatic agents, colorant aids, weather-resistance agents, colorants, ultraviolet (UV) absorbers, ultraviolet (UV) blocking agents, flame retardants, filler, nucleating agents, adhesion aids, adhesives, and the like, and mixtures thereof, depending on its application.

Examples of the antioxidant may include without limitation phenol-type antioxidants, phosphate-type antioxidants, thioether-type antioxidants, amine-type antioxidants, and the like, and combinations thereof. Examples of the release agent may include without limitation fluorine-included polymers, silicone oils, metal salts of stearic acid, metal salts of montanic acid, montanic acid ester waxes, polyethylene waxes, and the like, and combinations thereof. Examples of the weather-resistance agent may include without limitation benzophenone weather-resistance agents, amine weather-resistance agents and the like, and combinations thereof. Examples of the colorant may include without limitation dyes, pigment, and the like, and combinations thereof. In addition, examples of the ultraviolet (UV) blocking agent may include without limitation titanium oxide ($TiO_2$), carbon black, and the like, and combinations thereof. Examples of the filler may include without limitation glass fiber, carbon fiber, silica, mica, alumina, clay, calcium carbonate, calcium sulfate, glass beads, and the like, and combinations thereof. When the filler is added, properties such as mechanical strength, heat resistance, and the like may be improved. Examples of the nucleating agent may include without limitation talc, clay, and the like, and combinations thereof.

The polyphenylene-ether-based resin composition can include one or more additives in an amount of about 0.1 to about 30 parts by weight, based on about 100 parts by weight of the base resin including the polyphenylene-ether-based resin and the polyamide resin. When the additive is included in an amount within the above range, the expected effects of the respective additives may be obtained, and excellent mechanical properties and improved surface appearance may be obtained.

The polyphenylene-ether-based resin composition according to one embodiment may be fabricated by a commonly known method. For example, the components mentioned above and optionally one or more additives can be mixed, and melt-extruded in an extruder to fabricate a pellet.

According to another embodiment, a molded product made using the polyphenylene-ether-based resin composition is provided. The polyphenylene-ether-based resin composition may be used in the production of a molded product that strongly needs electrical conductivity, impact strength, heat resistance, and the like such as part materials for various applications, including automotive parts such as but not limited to tailgates, fuel doors for cars, fenders for cars, door panels, and the like.

Hereinafter, the embodiments are illustrated in more detail with reference to examples. However, the following examples are exemplary embodiments and the present invention is not limited thereto.

EXAMPLES

A polyphenylene-ether-based resin composition according to one embodiment includes each component as follows.
(A) Base Resin
(A-1) Polyphenylene Ether-based Resin
Poly(2,6-dimethyl-phenylene)ether (GE plastic HPP-820 made by GE plastics Ltd.) is used.
(A-2) Polyamide Resin
VYDYNE 50BW of polyamide 66 manufactured by Solutia Inc. is used.
(B) Carbon Nanotubes
C-tube 100 of multi-walled carbon nanotubes having a diameter of 10 to 50 nm and a length of 1 to 25 μm manufactured by CNT Co., Ltd. is used as the carbon nanotube.
(C) Styrene-based Copolymer
A poly(styrene-ethylene-butadiene) triblock copolymer (G1651 of Shell Chemical Co.) is used.
(D) Olefin-based Copolymer
A maleic anhydride group-grafted ethylene-octene copolymer of FUSABOND MN493D (manufactured by DuPont) is used.
(E) Reactive Monomer
Citric acid anhydride of Samchun Pure Chemical Ltd. is used.

Examples 1 to 5 and Comparative Examples 1 to 4

Each aforementioned component is mixed according to the composition amount as shown in the following Table 1 to prepare polyphenylene-ether-based resin compositions. Then, each composition is melt-kneaded by using a twin screw melt-extruder heated at 280 to 300° C. to fabricate a chip. The chip is dried at 130° C. for 5 hours or more, and then 10 cm width×10 cm height×0.3 cm thickness flat specimens are fabricated using a screw-type injector heated at 280 to 300° C. at a molding temperature ranging from 80 to 100° C.

TABLE 1

| | | Example | | | | | Comparative Example | | | |
|---|---|---|---|---|---|---|---|---|---|---|
| | | 1 | 2 | 3 | 4 | 5 | 1 | 2 | 3 | 4 |
| (A) Base resin | (A-1) polyphenylene ether-based resin (wt %) | 58 | 58 | 58 | 58 | 58 | 58 | 58 | 58 | 58 |
| | (A-2) polyamide resin (wt %) | 42 | 42 | 42 | 42 | 42 | 42 | 42 | 42 | 42 |
| (B) Carbon nanotube (parts by weight)* | | 0.5 | 1.2 | 1.8 | 1.2 | 0.5 | 1.8 | 1.8 | 5.5 | 1 |
| (C) Styrene-based copolymer (parts by weight)* | | 10 | 10 | 10 | 6 | 10 | 10 | 20 | 10 | — |
| (D) Olefin-based copolymer (parts by weight)* | | 5 | 1 | 5 | 15 | 5 | 25 | — | 5 | 10 |
| (E) Reactive monomer (parts by weight)* | | — | — | — | — | 1 | — | — | — | — |

*parts by weight: denotes a content unit represented based on 100 parts by weight of the base resin (A)

Experimental Examples

The properties of the specimens of Examples 1 to 5 and Comparative Examples 1 to 4 are evaluated in accordance with the following methods. The results are provided in the following Table 2.
(1) Notch Izod impact strength: 1/8" thick specimen is measured according to ASTM D256.
(2) Heat deflection temperature: heat deflection temperature is measured according to ASTM D648.
(3) Sheet resistance: The specimens are evaluated by applying 100V voltage and using a 4-probe method.

TABLE 2

| | Examples | | | | | Comparative Examples | | | |
|---|---|---|---|---|---|---|---|---|---|
| | 1 | 2 | 3 | 4 | 5 | 1 | 2 | 3 | 4 |
| Impact strength (kgf · cm/cm) | 22 | 18 | 16 | 20 | 24 | 20 | 10 | 7 | 11 |

TABLE 2-continued

| | Examples | | | | | Comparative Examples | | | |
|---|---|---|---|---|---|---|---|---|---|
| | 1 | 2 | 3 | 4 | 5 | 1 | 2 | 3 | 4 |
| Heat deflection temperature (° C.) | 201 | 202 | 202 | 201 | 201 | 188 | 190 | 202 | 203 |
| Sheet resistance (Ω/sq) | $10^{11}$ | $10^{10}$ | $10^{8}$ | $10^{10}$ | $10^{11}$ | $10^{8}$ | $10^{8}$ | $10^{4}$ | $10^{11}$ |

As shown in Tables 1 and 2, Examples 1 to 5 including polyphenylene ether-based resin, polyamide resin, carbon nanotubes, styrene-based copolymer, and olefin-based copolymer have excellent impact strength and heat resistance while maintaining excellent electrical conductivity compared to Comparative Example 1 including olefin-based copolymer in an amount outside of the range according to exemplary embodiments, Comparative Example 2 including no olefin-based copolymer, Comparative Example 3 including carbon nanotubes in an amount outside of the range according to exemplary embodiments, and Comparative Example 4 including no styrene-based copolymer.

Particularly, Comparative Examples 2 and 4 including either styrene-based copolymer or olefin-based copolymer exhibited significantly deteriorated impact strength as compared to Examples 1 to 4 including both.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polyphenylene-ether-based resin composition, consisting essentially of:
   (A) a base resin including (A-1) about 5 to about 95 wt % of a polyphenylene ether-based resin and (A-2) about 5 to about 95 wt % of a polyamide resin;
   (B) about 0.01 to about 5 parts by weight of carbon nanotube, based on about 100 parts by weight of the base resin;
   (C) about 1 to about 20 parts by weight of a styrene-based copolymer, based on about 100 parts by weight of the base resin;
   (D) about 1 to about 20 parts by weight of an olefin-based copolymer, based on about 100 parts by weight of the base resin; and
   (E) optionally a reactive monomer.

2. The polyphenylene-ether-based resin composition of claim 1, wherein the polyphenylene ether-based resin (A-1) is a polyphenylene ether resin, or a mixture of a polyphenylene ether and a vinyl aromatic polymer.

3. The polyphenylene-ether-based resin composition of claim 2, wherein the polyphenylene ether resin is poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly (2,3,6-trimethyl-1,4-phenylene)ether, a copolymer of poly (2,6-dimethyl-1,4-phenylene)ether and poly(2,3,6-triethyl-1,4-phenylene)ether, or a combination thereof.

4. The polyphenylene-ether-based resin composition of claim 1, wherein the polyamide resin (A-2) is polycaprolactam (polyamide 6), poly(11-aminoundecanoic acid) (polyamide 11), polylauryllactam (polyamide 12), polyhexamethylene adipamide (polyamide 66), polyhexamethylene azelamide (polyamide 69), polyhexamethylene sebacamide (polyamide 610), polyhexamethylene dodecanodiamide (polyamide 612), a copolymer thereof, or a combination thereof.

5. The polyphenylene-ether-based resin composition of claim 1, wherein the carbon nanotubes (B) have a diameter of about 0.5 to about 100 nm, and a length of about 0.01 to about 100 μm.

6. The polyphenylene-ether-based resin composition of claim 1, wherein the styrene-based copolymer (C) is an AB-type diblock copolymer, a ABA-type triblock copolymer, a radical block copolymer, or a combination thereof.

7. The polyphenylene-ether-based resin composition of claim 1, wherein the styrene-based copolymer (C) is a copolymer of a vinyl aromatic monomer, and a diene comprising a hydrogenated unsaturated diene, a partially hydrogenated unsaturated diene, an unsaturated diene without hydrogenation, or a combination thereof.

8. The polyphenylene-ether-based resin composition of claim 1, wherein the olefin-based copolymer (D) is a copolymer polymerized with different olefin-based monomers, or a copolymer of an olefin-based monomer and an acrylic-based monomer.

9. The polyphenylene-ether-based resin composition of claim 1, wherein the olefin-based copolymer (D) comprises a reactive group capable of reacting with the polyamide resin.

10. The polyphenylene-ether-based resin composition of claim 9, wherein the reactive group comprises a maleic anhydride group, an epoxy group, or a combination thereof.

11. The polyphenylene-ether-based resin composition of claim 1, wherein the reactive monomer (E) is present in an amount of about 0.5 to about 2 parts by weight based on about 100 parts by weight of the base resin.

12. The polyphenylene-ether-based resin composition of claim 11, wherein the reactive monomer (E) comprises an unsaturated carboxylic acid or an anhydride group thereof.

13. The polyphenylene-ether-based resin composition of claim 11, wherein the reactive monomer (E) is citric acid anhydride, maleic anhydride, maleic acid, itaconic anhydride, fumaric acid, (meth)acrylic acid, (meth)acrylic acid ester, or a combination thereof.

14. A molded product made using the polyphenylene-ether-based resin composition of claim 1.

* * * * *